(12) United States Patent
Raiyat

(10) Patent No.: US 6,239,844 B1
(45) Date of Patent: May 29, 2001

(54) TELEVISION RECEIVER

(75) Inventor: Farzad Raiyat, Eastleigh (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/454,344

(22) Filed: Dec. 3, 1999

(30) Foreign Application Priority Data

Dec. 5, 1998 (GB) .................................................. 9826698

(51) Int. Cl.$^7$ .............................. H04N 7/00; H04N 11/00; H04N 7/08; H04N 7/084; H04N 7/087
(52) U.S. Cl. .......................... 348/468; 348/461; 348/465; 348/467; 348/473; 348/474; 348/478
(58) Field of Search ..................... 348/461, 465, 348/467, 468, 473, 474, 478

(56) References Cited

U.S. PATENT DOCUMENTS

| 5,208,671 | * | 5/1993 | Tarrant | 358/147 |
| 5,353,064 | * | 10/1994 | Schlink | 348/468 |
| 5,650,826 | * | 7/1997 | Eitz | 348/468 |
| 5,652,613 | | 7/1997 | Lazarus et al. | 348/7 |
| 5,757,414 | * | 5/1998 | Thorne | 348/461 |
| 5,889,950 | * | 3/1999 | Kuzma | 348/461 |
| 5,905,537 | * | 5/1999 | Van Gestel | 348/468 |
| 5,910,821 | * | 6/1999 | Gyarmati | 348/468 |
| 5,977,962 | * | 11/1999 | Chapman et al. | 348/465 |
| 5,982,445 | * | 11/1999 | Eyer et al. | 348/461 |
| 5,987,214 | * | 11/1999 | Iwamura | 348/468 |
| 6,005,631 | * | 12/1999 | Anderson et al. | 348/460 |
| 6,064,439 | * | 5/2000 | Kimura et al. | 348/468 |
| 6,075,568 | * | 6/2000 | Matsuura | 348/478 |

FOREIGN PATENT DOCUMENTS

0828388A2   11/1998   (EP) .............................. H04N/7/088

* cited by examiner

Primary Examiner—Reinhard J. Eisenzopf
Assistant Examiner—Brian P. Yenke
(74) Attorney, Agent, or Firm—Edward W. Goodman

(57) ABSTRACT

A television receiver for receiving data signals, particularly teletext, associated with a television signal, has a page memory (13) for storing a plurality of pages for display on a display screen. In order to use the memory with maximum effectiveness, a queue is formed in order of priority of requests for allocation of memory locations for storing pages. Various features, such as FASTEXT, TOP, EPG, WST level 2.5, each require a certain minimum number of pages to allow the feature to be achieved. Each feature has a dedicated page request generator (PG-1 to PG-n) which each provide an ordered list of page requests. These page requests are fed to priority setter (P) which allocates for each of the page request generators, a given priority based on a priority scheme (PS) and a list of connected page request generators (PGL). The page request generators (PG-1 to PG-n) react to system events source (S1), broadcast event sources (S2), and/or user event sources (S3). This enables the easy addition or deletion of features.

5 Claims, 3 Drawing Sheets

TELEVISION RECEIVER

BACKGROUND OF THE INVENTION

1. Field of the Invention

The invention relates to a television receiver for receiving a television signal having a data signal associated therewith, said data signal representing pages of text and/or graphics.

2. Description of the Related Art

Such television receivers are well known in which the data signal associated with the television signal is a teletext signal. The teletext signal is multiplexed with the television signal by transmitting it during the vertical blanking interval of a standard analog television signal. The television receiver then includes a teletext decoder which is able to acquire the data signals transmitted in the vertical blanking interval, and store and display one or more pages of the information represented by the teletext data signal. Teletext decoders have become increasingly complex in order to offer additional features, such as FASTEXT, TOP, EPG, Favorite Pages etc. and are normally controlled by a microcontroller which, in order to allow the additional features to be selected and displayed, has increasing amounts of software stored in programme memory associated with the microcontroller. As further features are added the re-writing of this software is an increasingly arduous task. In addition, a series of different teletext decoders which differ in the number of features provided, comprise basically the same hardware, that is microcontroller, data acquisition circuit, and display circuits, but have varying amounts of associated memory for storing the received data and differing programme memory to enable either only basic functions to be performed or allowing more complex additional features to be provided.

One of the known problems with the teletext system is the time taken after a request by a viewer to acquire a particular page of information. This arises because the pages are sent serially and there is a cycle time of the order of 30 seconds for all the data to be transmitted. It is, of course, impossible to acquire and store data apart from when the page is transmitted in the cycle. One way of overcoming this disadvantage is to provide a large amount of data storage in the television receiver so that all pages of a cycle may be acquired in the background and, when the user wishes to view a teletext page, it will then already be stored in the memory. This however, does require a large memory particularly when allowance has to be made for rotating pages as well as the normal magazine pages.

A number of schemes have been devised for anticipating which pages a viewer is likely to wish to access and to give priority to the acquisition and storage of those pages. Examples are the FASTEXT system and the TOP system. In these systems, pages are grouped according to the broadcaster's anticipation of which pages are likely to be of interest to a viewer who has accessed a particular page. With the FASTEXT system, the numbers of the pages which are linked to the page currently selected are sent in extension packets or ghost rows of the teletext signal. The microcontroller then decodes these additional page links and instructs the acquisition circuit to acquire those pages. In the TOP system a different approach is adopted in that a special page, called the Table of Pages is transmitted which indicates those pages which are in the transmission cycle and the way in which they are grouped. Thus, when a particular page is selected, the microcontroller will access the Table of Pages and determine from the Table which further pages should be acquired as being likely to be of interest to a viewer who has selected the page in question.

Further, television receivers are known in which the habits of the viewer are monitored and a list of habitually accessed pages is constructed and stored in memory. These pages are then acquired as soon as the receiver is switched on, or when the received channel is changed, as being the pages most likely to be accessed by the viewer. In this case, the habitually accessed or Favorite Pages will be stored in a portion of the memory associated with the teletext decoder. Thus, provided a minimum time elapses between activating the receiver or changing channel and the viewer deciding to attempt to access teletext pages, then those particular pages will already be available when the viewer requests them and it will not be necessary to wait for them to reappear in the transmission cycle before being able to display them.

A number of other services are also being introduced, such as electronic program guide (EPG), and it is becoming increasingly difficult to determine which pages should be acquired by the data acquisition circuit and stored in memory in order to enable the viewer to have the fastest access to the information.

SUMMARY OF THE INVENTION

It is an object of the invention to enable the provision of a television receiver in which teletext or other data signals may be acquired and stored in an efficient manner so that the viewer is able to access pages of information without unacceptable delay.

The invention provides a television receiver for receiving a television signal having a data signal associated therewith, said data signal representing pages of text and/or graphics, a page being displayable in place of or superimposed on a television picture, said television receiver including means for acquiring at least requested pages of said data, a page memory having a plurality of locations for storing requested pages of said data, and means for generating an ordered queue of locations within the page memory for storing the requested pages; wherein said generating means comprises a plurality of page request generators, each page request generator being arranged to receive requests from a different source or for a different purpose for pages having selected addresses to be stored and producing in response to the received requests an ordered priority list of addresses of pages requested to be stored in the page memory, priority setting means coupled to each of the page request generators for allocating priority between the page requests of the lists of page requests of each of the page request generators, the priority setting means being arranged to produce therefrom the ordered queue of page requests and to cause said queue to be updated when any of the page request means receives a page request and updates its own priority list in response thereto.

By this means, the capacity of the page memory may be efficiently utilized so that the pages most likely to be accessed by a viewer are pre-captured and stored in the page memory and are consequently available for display with a minimum of delay.

The page request generators, which may be computer programs controlling the microcontroller which controls the data acquisition and storage, each deal with a specific class of requests. Thus, there is a display page request generator which reacts to the request by the user using a remote control unit (RCU) for a particular page to be acquired and displayed. Thus, the microcontroller will monitor page requests made by a viewer using an RCU, and when one is received, will cause the display page request generator to determine the priority within that class of page requests and to request a place in a priority queue from the priority setting means. A further page request means may control the microcontroller so that it causes the data acquisition circuit to acquire all the favorite pages of the viewer and to store them in the page memory. A further page request means may react to data which is contained in the teletext signal. Thus, for example, when FASTEXT page links are being transmitted, then when a page is acquired, there are a number of extension packets which specify the pages which are linked to the acquired page. Thus, a page request generator will use the information relating to the linked pages to cause an ordered list of those particular linked pages to be produced and requested from the priority setting means. Similarly, with the TOP system, the page request means for the TOP data will request the pages which are linked to the displayed page. All these various page request means will be submitting requests to the microcontroller to acquire particular pages and, in order to enable the microprocessor to instruct the acquisition circuit to acquire the pages in the most efficient manner, a priority setting means is coupled to each of the page request means. The priority setting means includes a scheme which defines the competing priorities of the pages which are requested by the page request generators.

By providing the priority setting means, it is possible to have separate page request generators for a number of different classes of page requests which enter their requests into the priority setting means. Consequently, each page request generator can operate independently of the others and the page request generator does not in itself have to allocate priorities between different sources of page requests. This simplifies the design of the different page request generators as they do not have to take into account the page request of other page request generators, and do not have to know what other facilities are provided for acquiring pages of the teletext data since this is taken care of by the priority setting means. Thus, a number of software modules can be generated which do not have to be changed when a greater or lesser number of facilities are incorporated in the teletext decoder. Also, the priority setting means can be relatively independent of the number of different page request means, since, if a page request generator does not exist, this merely means that there is no request to the priority setting means for pages from that particular page request generator.

BRIEF DESCRIPTION OF THE DRAWINGS

The above and other features and advantages of the invention will be apparent from the following description, by way of example, of an embodiment of the invention, with reference to the accompanying drawings, in which.

DESCRIPTION OF THE PREFERRED EMBODIMENTS

Figure 1:
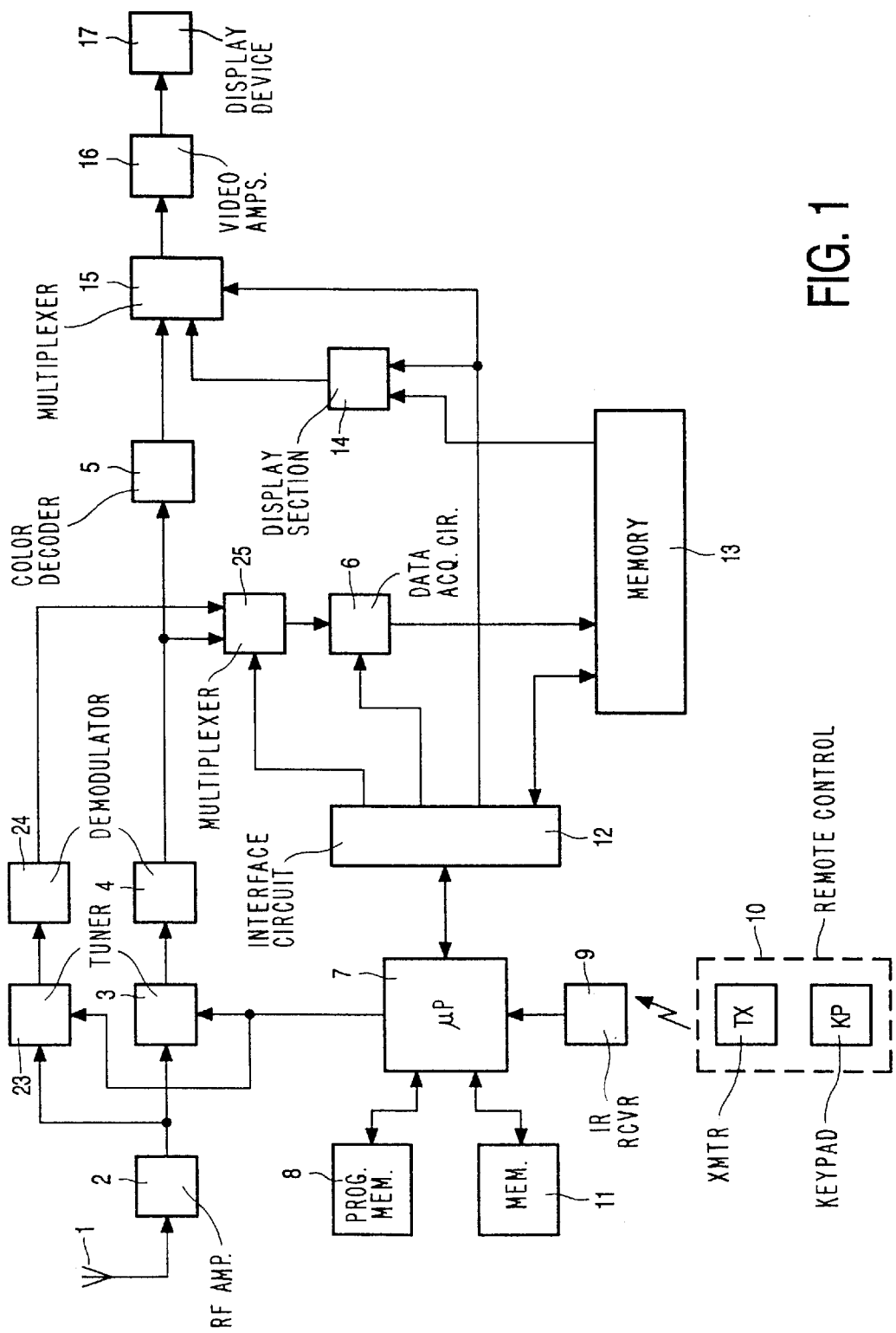
FIG. 1 shows, in block schematic form, a television receiver according to the invention.

As shown in FIG. 1 the television receiver comprises an aerial 1 which is connected to the usual RF amplifying circuit 2. The output of the RF amplifying circuit is fed to a tuning circuit 3 which selects the channel to be received. The output of the tuning circuit 3 is fed to a demodulation circuit 4 having an output for providing a combined video and blanking signal. The combined video and blanking signal is fed to a color decoder 5 and to a data acquisition circuit 6 which is arranged to acquire the data multiplexed with the television signal. A microprocessor 7 having a program memory 8 receives input signals from an infra-red receiver 9. These input signals are instructions from a user, using a remote control unit 10 which comprises a keypad KP and an infra-red transmitter TX, to transmit appropriately coded instructions through the receiver 9 to the microprocessor 7. These instructions to the microprocessor 7 will include the usual functions of switching the receiver from stand-by to a particular channel, selecting whether a television picture or text should be displayed, and determining which data pages should be acquired for display. Thus, typically, the remote control unit 10 will comprise a numerical keypad and a number of other function keys which relate to the selection for display of picture, text, or mixed mode, and many other features which may be provided on a television receiver and/or video recorder. The microprocessor 7 also has an associated non-volatile memory 11, in which data can be entered which gives, for example, the information needed to be passed from the microprocessor 7 to the tuning circuits 3 to select each of the channels. The data in the non-volatile memory 11 is entered at the time the television set is set up for initial use. The memory 11 may also include details of the favorite pages of the data associated with given channels for a particular user. This information may be entered by the user using the keypad on the remote control unit 10, or may be derived and/or updated by monitoring which pages the user habitually requests. The microprocessor 7 is connected through an interface circuit 12 to the data acquisition circuit 6 and to a memory 13 which stores the data for each page of the data signal which is acquired by the data acquisition circuit 6 and is referred to hereinafter as the teletext page store. In this way, the microprocessor 7 controls which pages of data are acquired and whether, and at what locations in the memory 13, they are stored. In some circumstances the data acquisition circuit 6 may be arranged to acquire all data transmitted and enter it into a FIFO (first in first out) memory from which the microprocessor 7 transfers the desired pages to store in the memory 13. The microprocessor 7 further communicates via the interface circuit 12 with a display section 14 which takes the data from the memory 13 and formats it for display on the screen of the television receiver.

The outputs of the color decoder 5 and display circuit 14 are fed to inputs of a multiplexer 15, which is arranged to select either the video or the text information for display or to select a mixture of the two. The microprocessor 7 controls the operation of the multiplexer 15 via the interface circuit 12. The output of the multiplexer 15 is fed via video amplifiers 16 to a display device 17.

Most current television receivers contain a microcontroller such as the microprocessor 7 in FIG. 1. This microcontroller receives instructions from the user via the remote control unit 10 which will contain a number of buttons which call up appropriate control functions. Thus, the remote control unit will normally have means for selecting a particular channel which the viewer wishes the receiver to select. This may be in the form of a numerical keypad which selects channel numbers. The microprocessor 7, in response to the channel number entered via the remote control unit 10, applies appropriate signals to the tuner 3 to cause it to select that particular channel. The signals produced by the microcontroller 7 are dependent on values stored in the non-volatile memory 11. Conventionally, when the television receiver is first installed, the microprocessor 7 causes the tuner to search through the waveband of the expected signals, and when a signal is detected, pauses at that particular setting and the user then enters the channel number that he/she wishes to allocate to that particular channel. This information is stored in the non-volatile memory so that the viewer can select a particular channel to be watched merely by entering the channel number on the remote control unit. In addition, it is known to store the page addresses of a plurality of pages of teletext associated with each channel. These page addresses are those which are most frequently accessed by the viewer. The page addresses stored in the non-volatile memory 11 may be entered by the viewer during a set-up procedure by using the numerical keypad on the remote control unit to enter the page addresses, or may be generated by the microprocessor 7 after monitoring which pages are habitually requested by the viewer.

As shown in FIG. 1, the television receiver may include a second tuner 23 which feeds a second demodulator 24 whose output is coupled to an input of a multiplexer 25. When these components are added, the output of the demodulator 4 is further coupled to a second input of the multiplexer 25 and the output of the multiplexer 25 is connected to the data acquisition circuit 6. The multiplexer 25 is controlled by the microprocessor 7 through the interface circuit 12. In this arrangement, the second tuner 23 and demodulator 24 may be arranged to scan through the available channels to continuously acquire and update the favorite pages associated with that channel. Thus, the viewer can view a particular program which is selected by the tuner 3 and, at the same time, the receiver is continuously updating the favorite pages for all the channels. In this way, the acquisition of the favorite pages is transparent to the viewer as it is carried out in the background by the receiver under the control of the microprocessor 7 using the additional tuning and demodulation circuits. The microprocessor 7 may be programmed so that the tuner 23 continuously scans through all channels. Alternatively, it may be arranged that the tuner 23 scans through all channels apart from that to which the tuner 3 is tuned.

The additional tuner 23 and demodulation circuit 24 may be already present in a television receiver including functions such as picture-in-picture (PIP). Another circumstance in which a second tuner may be present is in a combined television receiver and video recorder, the second tuner enabling a video recording to be made of the program transmitted in one channel while the receiver is tuned to a second channel. In such receivers, when neither the recording nor the PIP function is being used, the tuner 23 may be used to scan the available channels so that the associated favorite pages may be acquired and updated for entry into the memory 13. In this case the additional hardware required for implementation of this function is minimized.

The features required for, or made possible by, the teletext or TV information capability of present middle to high range TV systems, requires sophisticated management of system resources. One of the system resources is the teletext page store 13. The page store of any multi-page teletext device is a resource used for an increasing variety of teletext features ranging from TOP and level 2.5 to intelligent page pre-capturing. Efficient use of this resource is desirable.

In order to enable such efficient use of the teletext page store 13, an arrangement for requesting pages to be stored in the teletext page store is required. The basic function achieved by the present invention is to facilitate access to the page store resource in a fair way between various TV information features, each demanding its set of pages to be acquired. Thus, a priority setting means is provided to handle the fact that a growing number of TV features need access to teletext pages in order to function. Each feature may require access to different pages with different priorities and, in addition, these features are prioritized differently depending on the wishes of the particular TV set manufacturer and/or the end users or viewers. The set of pages required by each feature may change depending on user requests and system or broadcast based events. Some user requests or system events may effect the state of a number of features. Each feature may have pages which it must have in order to operate at all. Some page requests have to be dealt with immediately for the page to be captured in time for a given feature to be activated. Each requested page may have different properties, such as priority, decoding technique, level of error correction, etc. The features may be running in different tasks in a multi-tasking system making communication more complex and performance more critical. The issue of multi-subcode page requests needs to be addressed by the priority setting means.

Figure 2:
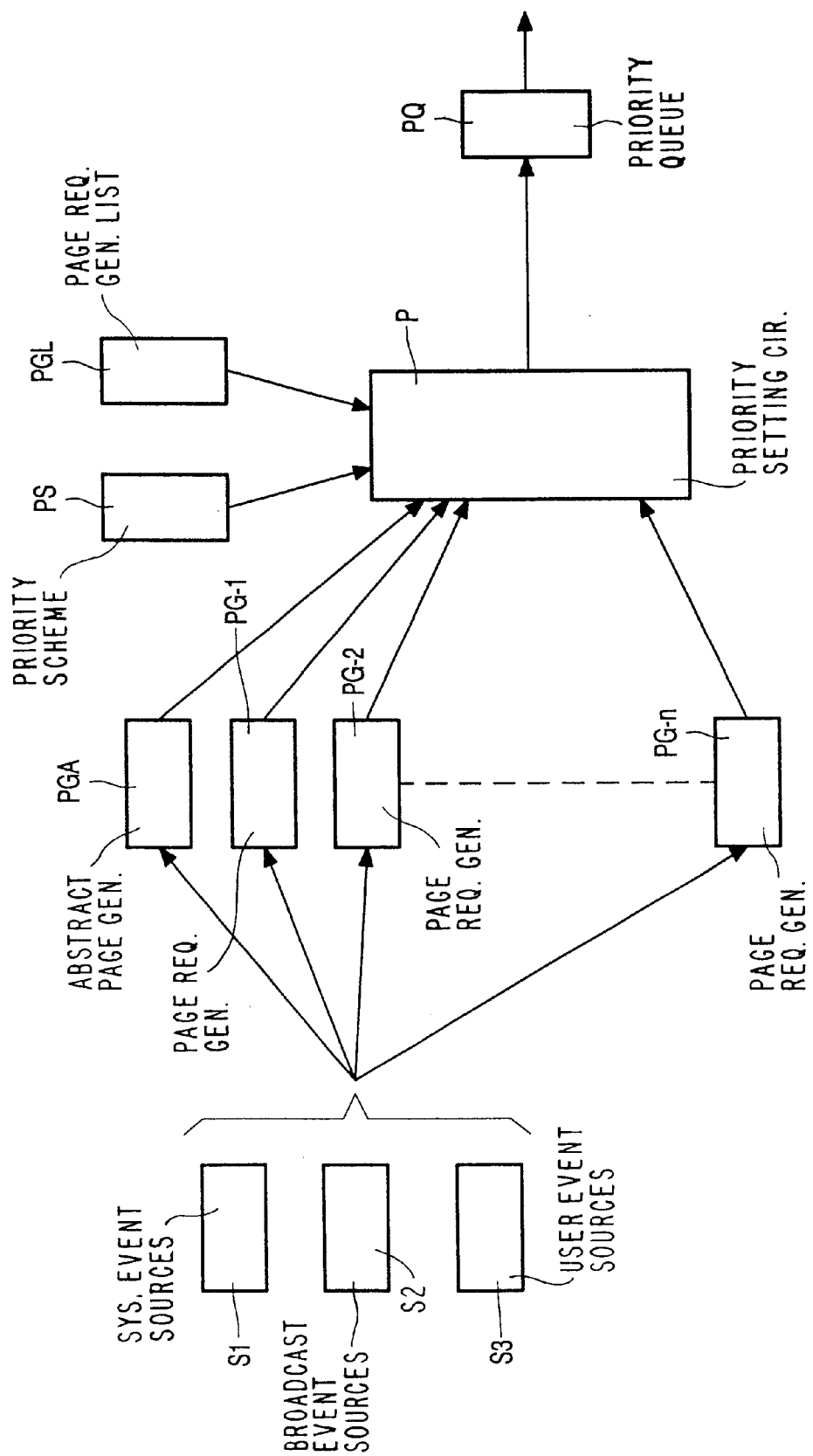
FIG. 2 shows an arrangement of page request generators and the priority setting means of the software controlling the microcontroller in the television receiver of FIG. 1.

As shown in FIG. 2, the arrangement consists of a number of components. The first is an abstract page generator PG-A, which standardizes the interface with which all other page request generators PG.-1 to PG-N, have to comply. The page request generators PG-1 to PG-N are responsible for requesting pages for the given feature for which that page request generator is provided to be able to operate. A further component is the priority scheme PS which defines how the priority setting means P selects the pages requested by the page request generators in such a way as to ensure that, on the whole, the page store contains pages most likely to be required either by the user or by one of the system features. A further component, the page request generator list PGL informs the priority setting means what page request generators are present and, in conjunction with the priority scheme, enables the priority setting means to select between the various page request generators to determine the order in which pages are requested.

Each page request generator may receive requests for particular pages to be acquired. These requests may come from a variety of sources S1 to S3. S1 represents system event sources and, for example, will cause the Favorite Pages page request generator to request acquisition of the users favorite pages on switch on of the receiver or on changing channels. S2 represents broadcast events and will cause page requests from page request generators to be made in response to data sent by a broadcaster. S3 represents user event sources, that is requests by a viewer for particular pages using the RCU or a request for Favorite Pages, etc. For example, the FASTEXT page request generator will request pages which are specified by the broadcaster in the form of color page links which should be pre-captured. The system builder, at initialization time maps the FASTEXT page request generator to the event for arrival of editorial page links of the display page and defines the FASTEXT page generator's priority with respect to that of other page request generators. The arrival of the FASTEXT link in the extension packet of the requested page triggers the FASTEXT page request generator to generate a list of the four FASTEXT pages in the red, green, yellow, blue priority order. The priority setting means P then goes through all the page request generators giving each the allowed number of page slots based on the predetermined priority scheme.

The TOP page request generator may be split into two page request generators, the first being responsible for generating a list of the known pages which are required to perform the function, the i.e., BTT and AITs, and the second being responsible for generating a list of required pages based on the currently displayed page and the linking defined in the BTT and AITs to the other linked pages. Thus, the first TOP page request generator reacts to events such as switch on of the receiver or changing of channels to generate its list of pages to be stored to perform the TOP feature. The second TOP page request generator then reacts to the acquisition and storage of a page for display and subsequently generates a list of page requests using information from the BTT and AITs.

Each page request generator is a component which creates a prioritized list of page requests based on some criteria related to the feature it supports. It uses the abstract page generator interface definition to allow the priority setting means access to its prioritized list. The criteria for the page request generator may be a predefined set of page requests or, alternatively, page requests which are dynamically derived from one or more root pages. An example of a predefined page is the basic TOP table (BTT), and a root page could be the page being displayed. Based on the root page, other pages may be added to the page request generator's list. For the given display page example, it could be display page +1, +2, −1, etc. The page request generators are responsible for ensuring that unnecessary page requests are not made.

For the arrangement to be able to prioritize all page requests from the different page request generators, a number of priority related issues need to be considered. First, the relative priority of the pages generated by a given page request generator have to be defined. For this, a simple linear priority of page requests is sufficient, this has, a range from maximum priority to minimum priority. Next, each page request in a page request generator is defined as having one of three priority classes. The first is class "must have", the second is class "wanted", and the third is class "desired". Essentially, the "must have" pages are the bare minimum for that page request generator and associated feature to be able to provide a useful function. The "wanted" pages are those which are usually needed to show the full impact of the feature. The "desired" pages are those which are nice to have but are not at all essential if the teletext page store resource is scarce.

In addition to these priority classes within a page request generator, each page request generator in the system will have a relative priority compared to the other page request generators and a maximum allocation of page requests for each priority class. These priorities are allocated by the priority scheme PS which will be defined by the system developer. Consequently, a given page request generator will be allowed a certain maximum number of "must have" requests, a certain maximum number of "wanted" requests, etc.

Figure 3:
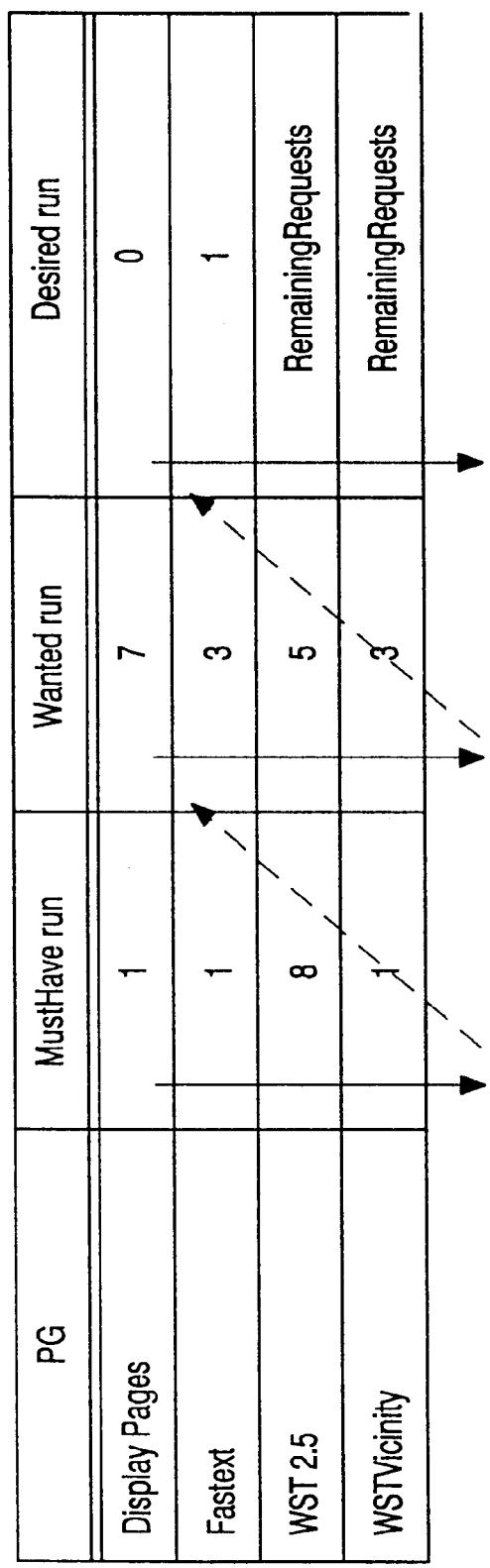
FIG. 3 illustrates the ordering of page requests using the arrangement of FIG. 2.

FIG. 3 shows an example of using this priority scheme which will result in the priority setting means starting to form a priority queue (PQ) of pages to be stored in the teletext pages store 13, by first taking the "must have" page requests from each of the four page address generators in turn. The page request generators are selected in turn in an order specified by the priority scheme. The first page request generator whose "must have" pages are taken is the Display Pages page request generator which requests those pages which are entered by the viewer using the numerical keypad on a remote control unit. The priority setting means then goes to the next page request generator which is the FASTEXT page request generator. The third page request generator to be serviced is the world system teletext (WST) level 2.5 page request generator and the last one to be serviced is the WST Vicinity page request generator. As shown, for the first, "must have", run, the priority setting means allocates one page to the Display Pages page request generator, one page to the FASTEXT page request page generator, eight pages to the WST level 2.5 page request generator and one page to the WST Vicinity page request generator. On the second, "wanted", run, seven pages are allocated to the Display Pages request generator, three to the FASTEXT page request generator, five to the WST level 2.5 Basic Data page request generator, and three pages to the WST Vicinity page request generator. On the third "desired" run, again a number of pages from each of the page request generator is accessed by the priority setting means. Sometimes a page request generator may not use all of its allocation. This is most visible during the third run when some generators have been given infinite access to the page store resource. This entitles the page request generator to request all pages it possibly may need. Having completed the third run, the priority setting means, if there are any locations in the page memory still not allocated will switch to a simple infinite round robin loop extracting one page request from each page request generator starting from, top of the page request generator list. It should be noted that at any time during any of the above runs, the priority queue may become full, that is, all the available locations in the page memory are allocated. This will end the page request regeneration process and obviously depends on the available page storage for the currently received channel.

There are times when a page request generator may need multiple subcodes of a page. This can be either of the form where the subcodes are consecutive (e.g., subcodes 1 to 50) or scattered (e.g., subcodes 7, 12, 1E4D). In the latter case, each subcode could be individually requested, but in the former case, requesting 50 pages, one at a time can put a hevy load on scarce processor time.

In order to avoid this heavy load, the generator has an element (Subcode Request) which allows page request generators to specify multi-subcode requests. This, however, has an impact on the working of the priority setting means, as the priority scheme defines the allowed number of single pages per page request generator per Priority Class. Therefore, if a page request generator makes one Page Request which actually consists of fifty (as in the above example), the priority setting means has to modify this request, reducing it to the allowed page allocation.

If the WST 2.5 example in FIG. 3 is considered, the page address generator has an eight page allocation for Priority Class "Must Have". Assuming that the first request it makes is for a page with 15 subcodes, the priority setting means will reduce this to 8 subcodes but remembers that 7 more requests remain. When the priority setting means is doing the second run "Wanted", it requests 5 more for this page request generator, and on the final run "Desired" it will request the other 2. Then, since the page request generator is marked 'Remaining Requests' in this class, it will handle all other requests form this page request generator, and if there are any page storage spaces left in the PriorityQ, it will use them for the other generators (WSTVicinity in this case).

The priority setting means has a compile time binding file which is split into three areas. The first is the tunable items section where the total number of page requests that the priority setting means can make is adjusted, that is, the total number of page requests allowed in the priority queue. The second area declares the page request generators, and the third area lists the page request generators and the number of requests they are allowed to make in each priority class.

The priority setting means is the core component that manages all the page request generators giving each the level of access to the teletext page store resource that is specified by the system builder. The interface assumes that the registration of the page request generators and the setting up of the priority scheme is managed at compile time.

While the invention has been described with particular reference to teletext as the data associated with a television signal, it is not limited thereto but is equally applicable to the allocation of storage locations in a memory to data of other forms associated with a television signal. Thus, although teletext data is sent in the vertical blanking interval of an analog television signal, the present invention can be applied to data signals associated with digital television signals. Further, the particular manner of multiplexing the data with a digital television signal is not significant in that it will only require modifications to the data acquisition circuit which is entirely separate from the arrangement of the present invention which seeks to utilize the memory allocated to the data, when acquired, in the most effective manner.

From reading the present disclosure, other modifications will be apparent to persons skilled in the art. Such modifications may involve other features which are already known in the design and use of television receivers and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. Applicants hereby give notice that new claims may be formulated to such features and/or combinations of such features during the prosecution of the present application or of any further application derived therefrom.

What is claimed is:

1. A television receiver for receiving a television signal having an associated data signal, said data signal representing pages of text and/or graphics, a page being displayable in place of or superimposed on a television picture, said television receiver comprising:

means for acquiring at least requested pages of said data;

a page memory having a plurality of locations for storing requested pages of said data; and means for generating an ordered queue of locations within the page memory for storing the requested pages, wherein said generating means comprises:

a plurality of page request generators, each page request generator receiving requests, from a different source or for a different purpose, for pages having selected addresses to be stored, and producing, in response to the received requests, an ordered priority list of addresses of pages requested to be stored in the page memory;

priority setting means coupled to each of the page request generators for allocating priority between the page requests of the lists of addresses of pages requested of each of the page request generators, the priority setting means producing an ordered queue of page requests and updating said ordered queue when any of the page request generators receives a page request and updates the respective priority list of addresses of pages requested in response thereto, wherein the priority setting means services each of the page request generators in a plurality of cycles, said priority setting means selecting, in each cycle, pages for insertion into the ordered queue, the pages entered into the ordered queue depending on a scheme stored in the priority setting means and on the priority list of addresses of pages requested generated by the page request generators.

2. The television receiver as claimed in claim 1, in which one of the page request generators receives page requests entered by a viewer using a remote control unit.

3. The television receiver as claimed in claim 1, in which one of the page request generators responds to page requests contained in the data received with the television signal.

4. The television receiver as claimed in claim 1, in which each page request generator allocates each of the requested pages to one of three classes of priority.

5. The television receiver as claimed in claim 4, in which the priority setting means services a highest class of the three classes of priority in each of the page request generators in a first cycle, a next highest priority class in a second cycle, and a third highest class in the next cycle, the priority setting means then servicing one page request from each page request generator in turn until all of the memory locations are allocated.

* * * * *